United States Patent [19]

Yarger et al.

[11] Patent Number: 5,063,075

[45] Date of Patent: Nov. 5, 1991

[54] AMIDE ETHER DERIVATIVES AS LOW CALORIE FAT MIMETICS

[75] Inventors: Ronald G. Yarger, Covent Station; Lawrence P. Klemann, Somerville; John W. Finley, Whippany, all of N.J.

[73] Assignee: Nabisco Brands, Inc., Parsippany, N.J.

[21] Appl. No.: 561,868

[22] Filed: Aug. 1, 1990

[51] Int. Cl.$^5$ ............................................. A23D 9/00
[52] U.S. Cl. .................................... 426/601; 260/404; 260/404.5; 426/603; 426/611; 426/612
[58] Field of Search ............... 426/601, 603, 606, 611, 426/612; 420/531; 260/404.5, 404

[56] References Cited

U.S. PATENT DOCUMENTS

| | | |
|---|---|---|
| 519,980 | 5/1894 | Winter . |
| 2,962,419 | 11/1960 | Minich ................................. 167/81 |
| 3,495,010 | 2/1970 | Fossel ................................. 424/312 |
| 3,579,548 | 5/1971 | Whyte ............................. 260/410.7 |
| 3,600,186 | 8/1971 | Mattson et al. ........................... 99/1 |
| 3,637,774 | 1/1972 | Babayan et al. ................. 260/410.6 |
| 3,876,794 | 4/1975 | Rennhard ............................. 426/152 |
| 3,969,087 | 7/1976 | Saito et al. ............................. 44/270 |
| 4,005,195 | 1/1977 | Jandacek ............................. 424/180 |
| 4,304,768 | 12/1981 | Staub et al. ........................ 424/180 |
| 4,508,746 | 4/1985 | Hamm ................................. 426/601 |
| 4,582,927 | 9/1986 | Fulcher ................................. 560/201 |
| 4,797,300 | 1/1989 | Jandarek et al. ..................... 426/549 |
| 4,830,787 | 5/1989 | Klemann et al. .................... 260/410 |
| 4,840,815 | 6/1989 | Meyer et al. ......................... 426/611 |
| 4,849,242 | 7/1989 | Kershner ............................. 426/601 |
| 4,861,613 | 8/1989 | White et al. ......................... 426/611 |
| 4,915,974 | 4/1990 | D'Amelia et al. ................... 426/611 |
| 4,927,659 | 5/1990 | Klemann et al. .................... 426/611 |

FOREIGN PATENT DOCUMENTS

| | | |
|---|---|---|
| 1106681 | 8/1981 | Canada . |
| 0205273 | 12/1986 | European Pat. Off. . |
| 0233856 | 8/1987 | European Pat. Off. . |
| 3529564 | 6/1987 | Fed. Rep. of Germany . |
| 2021579 | 12/1979 | United Kingdom . |

OTHER PUBLICATIONS

Bandi, Z. L. et al., FEBS Lett. 12; 217-220 (1971).
Blomstrand, R., Proc. Soc. Exp. Biol., Med. 102: 662-665 (1959).
Booth, A. N., and Gros, A. T., J. Amer. Oil Chem. Soc. 40: 551-553 (1963).
Garner, C. W., and Smith, L. C., Biochem. Biophys. Res. Commun. 39: 672-682 (1970).
Goodman and Gilman's, "Pharmacological Basic of Therapeutics", 7th Ed. Macmillian Pub. Co., N.Y. 1002-1003 (1985).
Gottenbos, J. J., Ch. 8 in Beare-Rogers, J., Ed., "Dietary Fat Requirements in Health & Development", A.O.C.S. 107-119 (1988).
Hamm, D. J., J. Food Sci. 49: 419-428 (1984).
Haumann, B. J., J. Amer. Oil Chem. Soc. 63: 278-288 (1986).
Hess, K., and Messmer, E., Ber. 54 B: 449-523, (1921), English Translation Included.
La Barge, R. G., Food Tech. 42: 84-90 (1988).
Mead, J. et al., Lipids, Plenam, N.Y., 459-473 (1986).
Morgan, R. G. H., and Hoffman, J., Lipid Res. 11: 223-230 (1970).
Oette, K., and Tschung, T. S., Hoppe-Seyler's 2, Psysiol. Chem. 361: 1179-1191 (1980).
Soodsma, J. F. et al., J. Biol. Chem. 247: 3923-3929 (1972).
Spener, Z. et al., Biochem. Biophys. Acta 152: 368-371 (1968).
Stryker, W. A., Arch. Path. 31: 670-692 (1941).
Tietz, A. et al., J. Boi. Chem. 239: 4081-4090 (1964).

Primary Examiner—Donald E. Czaja
Assistant Examiner—Leslie Wood

[57] ABSTRACT

Amide ether derivatives of the general formula:

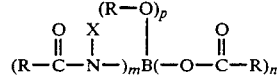

where
B is an organic radical having from 2 to 12 carbons,
each R is, independently, an aliphatic group having 1 to 30 carbons,
X = H, R or (CO)—R,
m = 1 to 2,
n = 0 to 6, and
p = 1 to 2 comprise a new class of low calorie fat mimetics. Methods of using and food compositions incorporating the new fat mimetics are disclosed.

29 Claims, No Drawings

AMIDE ETHER DERIVATIVES AS LOW CALORIE FAT MIMETICS

BACKGROUND OF THE INVENTION

This invention relates to the use of ether amide derivatives as low calorie fat mimetics. These compounds have a ($C_2$ to $C_{12}$) backbone to which are attached one or two aliphatic groups in ether linkage and one to four aliphatic groups in amide linkage.

Dietary fat is the most concentrated source of energy of all the nutrients, supplying 9 kcal/gram, about double that contributed by either carbohydrate or protein. The amount of fat in the American diet has increased in the last 60 years by about 25% (Mead, J., et al. Lipids, Plenum, N.Y., 1986, page 459), so that fats now provide approximately 40% of the daily caloric intake. Moreover, technological advances in the food industry, including efficient and safe hydrogenation procedures, have changed the kind of fat in foods.

Because fats are high in calories and because certain fats appear to pose a health risk when consumed in large quantities over time, a number of national advisory committees on nutrition have made recommendations differing in detail, but the common theme is a reduction in the total amount of fat in the diet (Gottenbos, J. J., chapter 8 in Beare-Rogers, J., ed., *Dietary Fat Requirements in Health and Development*, A.O.C.S. 1988, page 109). Yet fat contributes to the palatability and flavor of food, since most food flavors are fat-soluble, and to the satiety value, since fatty foods remain in the stomach for longer periods of time than do foods containing protein and carbohydrate. Furthermore, fat is a carrier of the fat-soluble vitamins, A, D, E, and K, and the essential fatty acids, which have been shown to be important in growth and in the maintenance of many body functions. Hence, major research efforts have focused on ways to produce food substances that provide the same functional and organoleptic properties as fats, but not the calories.

A number of fat replacements have heretofore been suggested (recently reviewed by Hamm, D. J., *J. Food Sci.* 49: 419-428 (1984), Haumann, B. J., *J. Amer. Oil Chem. Soc.* 63: 278-288 (1986) and LaBarge, R. G., *Food Tech.* 42: 84-90 (1988)). Hamm divides replacement fats into two broad categories: structurally re-engineered triglycerides modified to retain their conventional functional properties in foods, while removing their susceptibility toward hydrolysis or subsequent absorption during digestion, and materials developed from chemistry unrelated to triglycerides.

Examples of the former class of triglyceride analogues include compounds having the glycerol moiety replaced with alternate polyols (e.g., pentaerythritol in U.S. Pat. No. 2,962,419 to Minich, or sugars, suggested by Hess, K., and Messmer, E., *Ber.* 54B: 499-523 (1921), and patented years later by Mattson and Volpenhein, U.S. Pat. No. 3,600,186, and Meyer, et al., U.S. Pat. No. 4,840,815); compounds having the fatty acids replaced with alternate acids (e.g., branched esters as described in U.S. Pat. No. 3,579,548 to Whyte); compounds having insertions between the glycerol and the fatty acid (e.g., ethoxy or propoxy groups in U.S. Pat. No. 4,861,613 to White and Pollard); compounds having reversed esters (e.g., malonates in U.S. Pat. No. 4,582,927 to Fulcher and trialkoxytricarballylates in U.S. Pat. No. 4,508,746 to Hamm); and compounds having the ester bonds replaced by ether bonds (Can. Pat. No. 1,106,681 to Trost).

Examples of Hamm's second category of fat replacements chemically unrelated to triglycerides are mineral oil (suggested as early as 1894 in U.S. Pat. No. 519,980 to Winter); polyglucose and polymaltose (U.S. Pat. No. 3,876,794 to Rennhard); jojoba wax (W. Ger. Pat. No. 3,529,564 to Anika); polyoxyalkylene esters (U.S. Pat. No. 4,849,242 to Kershner); polyvinyl alcohol esters (U.S. Pat. No. 4,915,974 to D'Amelia and Jacklin); and polysiloxane (Eur. Pat. Ap. No. 205,273 to Frye).

Nondigestible or nonabsorbable edible fat replacements have proved disappointing when tested in feeding trials, where gastrointestinal side effects occurred, in some cases so extreme that frank anal leakage was observed. Nondigestible fats appear to act as a laxative and are expelled from the body, eliciting foreign body reactions like those early documented for mineral oil (Stryker, W .A., *Arch. Path.* 31: 670-692 (1941), more recently summarized in Goodman and Gilman's *Pharmacological Basis of Therapeutics*, 7th ed., Macmillan Pub. Co., N.Y. 1985, pp. 1002-1003). Similarly, a series of experimental fats, e.g., glyceride esters of dibasic acids, synthesized by U.S.D.A. in the 1960's exhibited undesirable gastrointestinal side effects when the compounds were fed to rats (Booth, A. N., and Gros, A. T., *J. Amer. Oil Chem. Soc.* 40: 551-553 (1963)); in several of the balance studies, the diarrhea was so extreme that digestibility coefficients could not be calculated (ibid., Table I, p. 552).

Polyglycerol and polyglycerol esters, suggested as fat replacements by Babayan and Lehman (U.S. Pat. No. 3,637,774), have been suggested for use as fecal softening agents as well (U.S. Pat. No. 3,495,010 to Fossel). A number of remedies have been recommended to combat the anal leakage observed when sucrose polyesters are ingested (e.g., employing cocoa butters, U.S. Pat. No. 4,005,195 to Jandacek, incorporating saturated fatty groups, Eur. Pat. Ap. No. 233,856 to Bernhardt, or mixing residues, U.S. Pat. No. 4,797,300 to Jandacek, et al.), and dietary fiber preparations have been incorporated into polysaccharide and/or polyol-containing foodstuffs to help inhibit the diarrheal effect (U.S. Pat. No. 4,304,768 to Staub et al.). Partially digestible fat replacements have also been suggested (U.S. Pat. No. 4,830,787 to Klemann and Finley; U.S. Pat. No. 4,849,242, cited above; and U.S. Pat. No. 4,927,659 to Klemann, et al.).

SUMMARY OF THE INVENTION

An object of the present invention is to provide a new group of edible fat replacement compounds having an array of up to three functional groups that can be selected to tailor the properties of the compounds and modulate caloric availability while minimizing laxative side effects. A further object is to attach fatty groups by means of relatively stable ether and amide linkages. These and other objects are accomplished by the present invention, which describes the use of amide ether compounds comprising a new class of edible synthetic fat mimetics, methods of using them, and food compositions incorporating them. These compounds have an organic backbone to which is attached at least one aliphatic group in ether linkage and at least one aliphatic group in amide linkage.

The new fat mimetics may be described by the general formula:

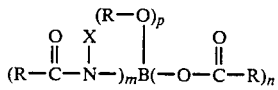

where
B is an organic radical having from 2 to 12 carbons,
each R is, independently, an aliphatic group having 1 to 30 carbons,
X=H, R or (CO)—R,
m=1 to 2,
n=0 to 6, and
p=1 to 2.

DETAILED DESCRIPTION OF THE INVENTION

The physiological behavior of a number of compounds analogous to natural fat triglycerides have been studied. Trialkylglycerols, structural analogues of triglycerides with the ester linkages replaced by ether linkages, are absorbed up to 0.2% at most, whereas by far the major portion passes through the gastrointestinal tract unchanged (Spener, F., et al., *Biochim. Biophys. Acta.* 152 368-371 (1968) and Morgan, R. G. H., and Hofman, *J. Lipid Res.* 11: 223-230 (1970); ; the latter paper suggests trialkylglycerols as nonabsorbable markers in lipid absorption studies). As mentioned above, Trost suggested these be employed as fat replacements (Can. Pat. No. 1,106,681).

Dialkylglycerols, compounds with two ether bonds linking fatty acid residues and one free hydroxyl group, are, on the other hand, absorbed to some extent (depending on the chain length of the fatty acid residues: 8%-10% for long chain residues). Monoalkyl glycerol, with one ether group and two free hydroxyls, are absorbed and metabolized (Bandi, Z. L., et al., *FEBS Lett.* 12: 217-220 (1971) and Blomstrand, R., *Proc. Soc. Exp. Biol. Med.* 102: 662-665 (1959)). It has been suggested that, though resistant to pancreatic lipase, the ether bonds of monoalkyl glycerols may be attacked by a cleaving and/or oxidizing enzyme (Soodsma, J. F., et al., *J. Biol. Chem.* 3923-3929 (1972) and Tietz, A., et al., *J. Biol. Chem.* 239: 4081-4090 (1964)).

Garner and Smith synthesized dioctanoyl 2-amino-1-propanol to use as a substrate for lipase (in a study conducted in monomolecular films, Garner, C. W., and Smith, L. C., *Biochem. Biophys. Res. Commun.* 39: 672-682 (1970)). Oette and Tschung subsequently suggested aminoglyceride derivatives as phospholipid analogues of possible pharmacological utility in promoting the in vivo formation of natural phospholipids (Gt. Brit. Pat. No. 2,021,579, page 5, line 23). When fed to rats, aminomonoglyceride derivatives were found to be metabolized and accumulated in organ lipids, mostly in the liver, but also in adipose tissue (Oette, K., and Tschung, T. S., *Hoppe-Seyler's Z. Physiol. Chem.* 361: 1179-1191 (1980)). The authors concluded that these monoglyceride analogues were metabolized to lecithin and cephalin analogues (GB 2,021,579, page 5, line 6).

The present invention provides amide ether derivatives, compounds having an organic radical backbone comprising 2 to 12 carbons to which are attached at least one and up to four aliphatic groups in amide linkaqe and one to two aliphatic groups in ether linkage, are useful as edible fat mimetics. The compounds may, additionally, have one to two aliphatic groups attached in amine linkage, and up to six aliphatic groups attached in ester linkage.

The amide ether derivatives of this invention comprise compounds having the following general formula:

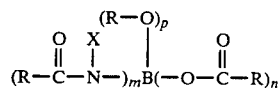

where
B is an organic radical having from 2 to 12 carbons,
each R is, independently, an aliphatic group having 1 to 30 carbons,
X=H, R or (CO)—R,
m=1 to 2,
n=0 to 6, and
p=1 to 2.

The compounds of this invention have a backbone B to which are attached at least two aliphatic groups (R): one in ether linkage (—OR) and one in amide linkage (—NX—(CO)—R, where X is as defined above). The compounds may further have a second R group attached in ether linkage, and a second R group attached in amine or amide linkage to the same nitrogen or in amine or amide linkage to a different nitrogen. The compounds may further have a third or fourth R group attached in amine or amide linkage, and zero to six aliphatic groups attached in ester (—O—(CO)—R) linkage.

Thus, simple derivatives have m=1 and p=1. In other embodiments, m+n+p=3 to 4; thus, in one embodiment, m+n+p=3 and in another embodiment, m+n+p=4. In other embodiments, notably sugar derivatives, m+n+p=4 to 8.

Backbone (B), may be derived from an alkanolamine which is a linear or branched aliphatic, carbocylic or heterocyclic. Examples of alkanolamines forming the compound backbones are aminoethanol, aminopropanol, aminopropanediol, diaminopropanol, aminobutanol, diaminobutanol, aminobutanediol, diaminobutanediol, aminopentanol, diaminopentanol, aminopentanediol, diaminopentanediol, aminohexanol, diaminohexanol, aminohexanediol, and diaminohexanediol. Chemical descriptions and formulae used here include isomeric variations.

As mentioned above, backbone B may also be carbocyclic or heterocyclic rather than acyclic. This invention encompasses cyclohexyl derivatives having a six-membered carbon ring (which may be saturated or unsaturated) to which is attached at least one aliphatic group in ether linkage and at least one aliphatic group in amide linkage as described in the general formula supra. Thus, aminocyclohexanols, diaminocyclohexanols, aminocyclohexanediols, diaminocyclohexanediols, their cyclohexane counterparts, and the like may form the compound backbones.

This invention further encompasses amide ether sugar derivatives such as those derived from mannose, glucose, lactose, sucrose, galatose, fructose, and the like, wherein R is a heterocyclic to which is attached at least one aliphatic group in ether linkage and at least one in amide linkage, such as, for example, glucosamine, galactosamine or amino-deoxyribose amide ethers, and the like.

The aliphatic groups (R) may be linear or branched, saturated or unsaturated. R groups are generally derived from natural or synthetic fatty acids of the formula RCOOH, where R is an aliphatic group having 1 to 30 carbons. Examples of fatty acids are acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, docosahexaenoic, and the like acids.

Mixtures of fatty acids may also be used, such as those obtained from the hydrolysis of non-hydrogenated, partially hydrogenated or fully hydrogenated soybean, safflower, sunflower, high oleic sunflower, sesame, peanut, corn, olive, rice bran, canola, babassu nut, coconut, palm, palm kernel, lupin, nasturtium seed, mustard seed, cottonseed, lowe erucic rapeseed or marine oils. Fatty acids derived from other fats, such as dairy butterfat, tallow or lard, or plant waxes such as jojoba may be employed. Specific fractions of natural or processed oils, fats or waves may also be used.

The R groups are selected to provide a discernible fatty character in the compounds. Thus, most of the R groups have 2 to 4 or more carbon atoms, with a majority containing 3 to 23, more narrowly 9 to 19, and even more narrowly, 15 to 17 carbon atoms. Preferred ether amide compounds can have an array of R groups selected to include 95% derived from acids having 14 to 18 carbon atoms. In one embodiment, the R should be predominantly saturated and derived from $C_{14}$ to $C_{18}$ acids. In another embodiment, the R should be predominantly derived from unsaturated $C_{16}$ to $C_{18}$ acids (with a preponderance of monounsaturated groups).

The choice, number and arrangement of R groups on the amide ether derivatives will affect the biological as well as physical properties of the compounds. Some compounds of this invention are noncaloric. Where any of the groups are hydrolyzed, the caloric value of the compound may increase. Where a group is metabolized, it may be a highly desirable or essential fatty acid residue such as linoleic acid.

Some compounds are partially digestible. By this is meant that the compounds deliver less than 9 kcal/gram, preferably less than 5, and, in some embodiments, less than 3 kcal/gram, upon being metabolized.

The amide ether compounds of this invention may be incorporated either alone, or in combination with another fat and/or fat mimetic, into any food composition or used in conjunction with any edible material. Other fats include natural triglycerides rich in highly desirable or essential fatty acids, such as oleic, linoleic, linolenic, or eicosapentaenoic acid, triglycerides bearing fatty acids having beneficial attributes such as those associated with conjugated linoleic acid isomers, medium chain triglycerides and the like. Other fat mimetics include any heretofore suggested as edible fat replacements, including, but not limited to, sugar esters, neoalkyl esters, polyglycerol esters, malonate esters, propoxylated qlycerols, retrofats, carboxy/carboxylates, polyvinyl alcohol esters, and the like.

The term "edible material" is broad and includes anything edible, whether or not intended for nutrition, e.g., it can be an additive such as an antioxidant for fats or oils, an antispatter agent, an emulsifier, a texture modifier such as a plasticizer for chewing gum, a component for cosmetics, or other minor functional ingredient such as a carrier or diluent for use in flavorings, pharmaceuticals, and the like.

Representative of food products which can contain, in addition to other ingredients, the amide ether compounds of this invention in full or partial replacement of natural fat are: frozen desserts, e.g., frozen novelties, ice cream, ices, sherbet, or milk shakes; puddings and pie fillings; margarine substitutes or blends; flavored bread or biscuit spreads; mayonnaises and mustards; salad dressings; filled dairy products such as filled cream or filled milk; dairy or non-dairy cheese spreads; coffee lighteners, liquid and dried; flavored dips; frying fats and oils; reformed and comminuted meats; meat substitutes or extenders; pet foods; egg products and substitutes; nut products such as peanut butter; whipped toppings; compound coatings; frostings and fillings; cocoa butter replacements or blends; candy, especially fatty candies such as those containing peanut butter or chocolate; chewing gum; breakfast cereals; bakery products, e.g., cakes, breads, rolls, pastries, cookies, biscuits, and crackers; mixes or ingredient premixes for any of these; as well as flavor, nutrient, drug or functional additive delivery systems.

The following is a list of representative, but not limiting, examples of amide ethers of this invention:

(A) Amide ethers comprising compounds having an aliphatic backbone of 2 to 6 carbons to which are attached one or two aliphatic groups in amide linkage, and one or two aliphatic groups in ether linkage. This category encompasses amide ethers having a third or fourth group attached in ester linkage. Examples of this class include

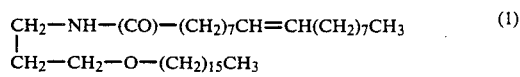

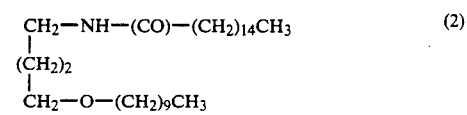

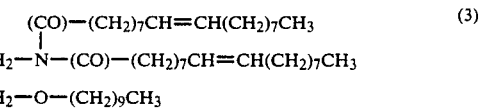

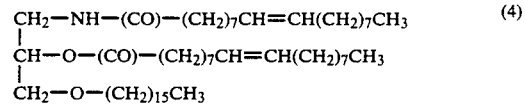

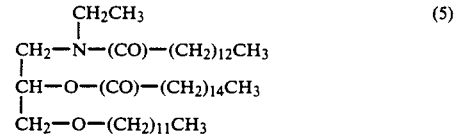

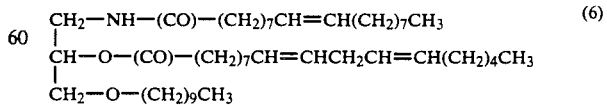

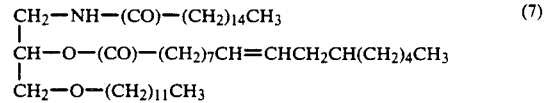

-continued

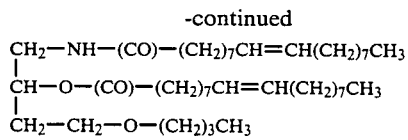 (8)

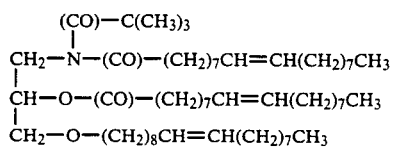 (9)

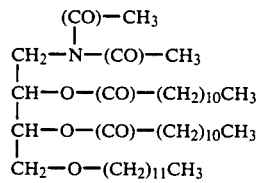 (10)

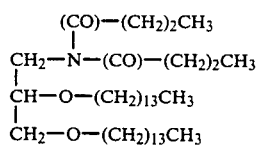 (11)

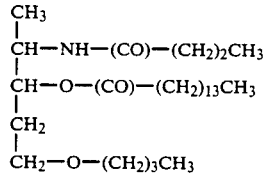 (12)

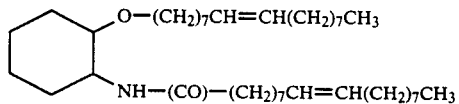 (13)

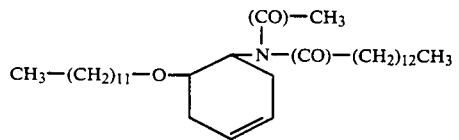 (14)

(B) Amide ethers comprising compounds having a backbone of 5 to 12 compounds to which are attached one or two aliphatic groups in amide linkage, and one or two aliphatic groups in ether linkage. This category encompasses amide ethers having other aliphatic groups attached in ester linkage. Examples of this class include

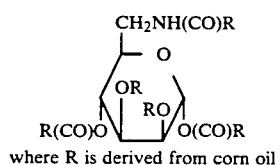 (15)

where R is derived from corn oil

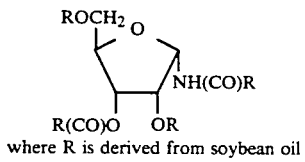 (16)

where R is derived from soybean oil

-continued

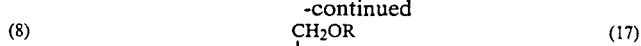 (17)

where R = —(CH$_2$)$_5$CH$_3$

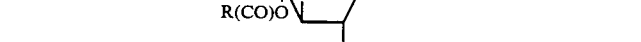 (18)

where R is derived from sunflower oil

A mixture of

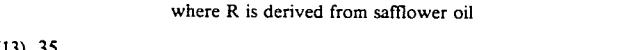 (19)

and

 (19)

where R is derived from safflower oil

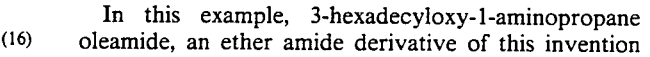 (20)

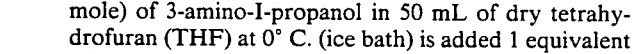 (21)

EXAMPLES

The following examples are presented to further illustrate and explain the present invention and should not be taken as limiting in any regard. Unless otherwise indicated, all parts and percentages are by weight, and are based on the weight at the particular stage of the processing being described. The proton nmr spectra have assigned chemical shifts, multiplicities, and intensities consistent with the structures for which they are reported.

EXAMPLE 1

In this example, 3-hexadecyloxy-1-aminopropane oleamide, an ether amide derivative of this invention depicted in structure (1) above, is prepared in this example.

To a magnetically stirred solution of 7.51 g (0.01 mole) of 3-amino-1-propanol in 50 mL of dry tetrahydrofuran (THF) at 0° C. (ice bath) is added 1 equivalent of hexane washed sodium hydride (NaH). To this suspension is then added 30.5 g of 1-bromohexadecane. When the reaction is complete (as determined by the disappearance of the bromohexadecane via thin-layer chromatography (TLC)), the solution is warmed to room temperature. To this is added 30.1 g (0.1 mole) of distilled oleoyl chloride, and the reaction mixture is gently heated to 60° C. for one hour, then cooled to room temperature. The mixture is then diluted with 200 mL ethyl acetate and washed with 5% HCl (100 mL), water (100 mL), dried over magnesium sulfate, filtered, and concentrated. The crude material is purified via silica gel eluent. Evaporation of the solvent affords of 3-hexadecyloxy-1-aminopropane oleamide.

EXAMPLE 2

In this example, 4-decyloxy-1-aminobutane palmitamide, an amide ether derivative of this invention depicted in structure (2) above, is synthesized.

A magnetically stirred solution of 8.91 g (0.1 mole) 4-amino-1-butanol at 0° C. is treated with one equivalent of sodium hydride followed by addition of 22.1 g (0.1 mole) of bromodecane. After one hour, the solution is warmed to room temperature whereupon 27.5 g (0.1 mole) of palmitoyl chloride is added dropwise. When the reaction is complete (as determined by the disappearance of the acid chloride via TLC), the mixture is diluted with 100 mL of ethyl acetate and washed with 5% HCl (100 mL), water (100 mL), dried over magnesium sulfate, and filtered. The crude material is chromatographed on silica gel using hexane/ethyl acetate/acetic acid (90/10/5; v/v/v) as eluent. Evaporation of the solvent affords 4-decyl-oxy-1-aminobutane palmitamide.

EXAMPLE 3

This example illustrates the preparation of an amide ether ester derivative depicted in structure (7) above.

A magnetically stirred solution of 3-dodecyloxy-2-hydroxy-1-amino propane (2.59 g, 0.01 mole) in 50 mL pyridine at room temperate is treated dropwise with 5.5 g (0.02 mole) palmitoyl chloride. After 1 hour, the reaction mixture is diluted with 100 mL of ethyl acetate and washed successively with 5% HCl (2×80 mL) and water (2×80 mL), dried over magnesium sulfate and filtered. The crude product is purified by silica gel chromatography using hexane/ethyl acetate/acetic acid (90/10/5; v/v/v) as eluent. Evaporation of the solvent yields the title compound.

EXAMPLE 4

In this example, another amide ether ester of this invention, 4-butoxy-2-oleoyloxy-1-aminobutane oleamide (depicted in structure (8) above) is prepared.

A magnetically stirred solution of 3.22 g (0.02 mole) 4-butoxy-2-hydroxy-1-aminopropane in 50 mL of dry pyridine is treated with 12.04 g (0.04 mole) of freshly distilled oleoyl chloride. The reaction is heated gently for one hour at 60° C., then cooled to room temperature and diluted with 200 mL of ethyl acetate. The solution is washed successively with 5% HCl (2×100 mL) and water (2×100 mL), dried over magnesium sulfate and filtered. Evaporation of the solvent yields 11.5 grams of crude material that is chromatographed on a silica gel column using hexane/ethyl acetate/ acetic acid (90/10/5; v/v/v) as eluent. Evaporation of the solvent yields 8.3 g (60%) of the title compound.

EXAMPLE 5

| Peanut Butter. Peanut butter may be prepared by mixing | |
|---|---|
| Ingredient | parts |
| Example 1 Amide Ether | 35.0 |
| with Peanut Flavor | 2.0. |
| Then Corn Syrup Solids | 12.0 |
| Salt | 1.0 |
| High Fructose Corn Syrup | 10.0 |
| are added while agitating. When well blended, add | |
| Defatted Peanut Flour | 40.0 |
| mix and package. | |

EXAMPLE 6

| Ice Cream. Vanilla ice cream may be prepared by mixing | |
|---|---|
| Ingredient | parts |
| Sugar (10X) | 15.0 |
| Nonfat Dry Milk | 3.9 |
| Salt | 0.4 |
| into Water | 39.0 |
| for 3 minutes. Then add melted | |
| Example 2 Amide Ether | 28.4 |
| and cook to 200° F. while mixing. Hold for 1 minute. Cool to 160° F., and add | |
| Sugared Egg Yolks | 12.5 |
| Vanilla Extract | 0.8 |
| and mix 1 minute. Cool and freeze to desired overrun. | |

EXAMPLE 7

| Whipped Topping. A whipped topping may be prepared by premixing | |
|---|---|
| Ingredient | parts |
| Example 3 Amide Ether | 26.0 |
| with Mono- and Di-glycerides | 2.0. |
| An aqueous phase is prepared by dissolving | |
| Water | 46.6 |
| Sugar (4X) | 23.0 |
| Dextrose | 1.0 |
| Polysorbate 60 | 0.7 |
| Sorbitan Monostearate | 0.3 |
| Carageenan | 0.2 |
| Guar Gum | 0.1 |
| Vanilla | 0.1. |

The oil blend is then added to the aqueous phase with high agitation. The topping can be packaged and refrigerated or frozen.

EXAMPLE 8

| Cream Cheese. To make an imitation cream cheese, add | |
|---|---|
| Ingredient | parts |
| Water | 53 |
| to Calcium Caseinate | 6.7 |
| Buttermilk Powder | 3.9 |
| Emulsifiers | 0.2 |
| Xanthan Gum | 0.2 |
| and mix three minutes. Melt | |
| Example 2 Amide Ether | 35.5 |
| and cook to 200° F. while mixing. Hold for one minute. Then cool to 150° F. and add | |

-continued

| Cream Cheese. To make an imitation cream cheese, add | |
|---|---|
| Ingredient | parts |
| Flavor, Acid and Color | 0.5 |
| and mix one minute. | |
| Fill, then cool and store. | |

EXAMPLE 9

| Cheddar-Style Cheese. To make Cheddar-style cheese, homogenize | |
|---|---|
| Ingredient | parts |
| Nonfat Milk | 75.0 |
| Low Temperature Nonfat Dry Milk | 4.0 |
| Example 1 Amide Ether | 20.0 |
| To this is added | |
| Salt | 0.7 |
| Lactic Acid Culture | 0.3 |

The mixture is fermented and pressed to a final composition of approximately 37.0% moisture, 63.0% total solids, and 32.0% fat mimetic.

EXAMPLE 10

| Process Pimento Cheese Food. Processed pimento cheese food may be prepared by melting | |
|---|---|
| Ingredient | parts |
| Example 9 Cheddar Cheese | 43.0 |
| and Swiss cheese | 44.0 |
| Into this is blended | |
| Dehydrated Pimento | 0.3 |
| and Water | 12.7 |
| and the mixture is cast into blocks. | |

EXAMPLE 11

| Imitation Sour Cream. An imitation sour cream may be prepared by adding | |
|---|---|
| Ingredient | parts |
| Water | 75.8 |
| to Modified Starch | 2.0 |
| Avicel | 1.0 |
| Distilled Monoglyceride | 0.7 |
| and Polysorbate 60 | 0.3 |
| and mixing three minutes. To this is added | |
| Example 3 Amide Ether | 16.5 |
| Condensed Skim Milk | 3.5 |
| and the mixture mixed three minutes, | |
| cooked to 195° F., and held | |
| five minutes. This may then | |
| be cooled to 60° F., and | |
| Flavors and Acids | 0.2 |
| added, followed by filling in the usual process. | |

EXAMPLE 12

| Mayonnaise. Mayonnaise may be prepared by adding | |
|---|---|
| Ingredient | parts |
| Water | 5.0 |
| to Sugar | 1.5 |
| and Spices | 3.5 |
| and mixing three minutes. To this is added | |
| Salted Egg Yolks | 8.0 |
| followed by mixing two minutes, adding | |
| Example 4 Amide Ether | 80.0 |

-continued

| Mayonnaise. Mayonnaise may be prepared by adding | |
|---|---|
| Ingredient | parts |
| then 120 Distilled Vinegar | 2.0. |

The mixture is blended 3 minutes and passed through a colloid mill set at 60 prior to filling in the usual process.

EXAMPLE 13

| Salad Dressing. Salad dressing may be prepared by adding | |
|---|---|
| Ingredient | parts |
| Water | 29.0 |
| to Sugar | 12.0 |
| and Spices | 4.5 |
| and mixing three minutes. Then | |
| Salted Egg Yolks | 5.5 |
| and Modified Starch | 3.0 |
| are added and mixed two minutes. | |
| To the aqueous mixture are added | |
| Example 1 Amide Ether | 40.0 |
| then 120 Distilled Vinegar | 6.0. |

The mixture is then mixed three minutes and passed through a colloid mill set at 60 prior to filling in the usual process.

EXAMPLE 14

| Italian Dressing. To make Italian dressing, add | |
|---|---|
| Ingredient | parts |
| Sugar | 4.0 |
| Xanthan Gum | 0.12 |
| to Water | 21.5 |
| at 125-130° F. and mix three minutes. Then add | |
| Garlic Vinegar Puree | 1.5 |
| Lemon Juice | 4.0 |
| White Vinegar (120) | 13.0 |
| and mix three minutes. Add | |
| Salt | 4.5 |
| Minced Garlic | 0.75 |
| Minced Onion | 0.50 |
| Red Bell Peppers | 0.05 |
| B.I. Spice Blend | 0.08 |
| and mix three minutes. | |
| Fill this aqueous phase 50% by weight with | |
| Example 4 Amide Ether | 50.0 |
| by weight. | |

EXAMPLE 15

| Vanilla Wafers. Vanilla wafers may be prepared by combining and mixing well | |
|---|---|
| Ingredient | parts |
| Flour | 40.0 |
| Sugar (10X) | 28.0 |
| Example 1 Amide Ether | 13.0 |
| Frozen Whole Eggs | 6.0 |
| High Fructose Corn Syrup | 4.0 |
| Salt | 0.7 |
| Vanilla | 0.3 |
| Sodium Bicarbonate | 0.3 |
| Sodium Aluminum Phosphate | 0.1 |
| Ammonium Bicarbonate | 0.1 |
| Water | 7.5 |
| aerating, and depositing onto a baking surface | |
| and baking in the usual manner. | |

EXAMPLE 16

| Ingredient | parts |
| --- | --- |
| Sugar | 30.0 |
| Flour | 25.0 |
| Frozen Whole Eggs | 16.0 |
| Example 4 Amide Ether | 14.7 |
| Nonfat Dry Milk | 13.0 |
| Sodium Bicarbonate | 0.7 |
| Vanilla | 0.4 |
| Salt | 0.2 |

White Layer Cake. A white layer cake may be prepared by combining, mixing well, panning off, and baking in the usual process.

EXAMPLE 17

| Ingredient | parts |
| --- | --- |
| Sugar (12X) | 65.0 |
| Example 2 Amide Ether | 11.0 |
| Dutched cocoa | 10.5 |
| Nonfat Dry Milk | 4.0 |
| Frozen Egg Yolk | 4.0 |
| Salt | 0.25 |
| Vanilla | 0.25 |
| Water | 5.0 |

Chocolate Icing. Chocolate icing may be prepared by blending, being careful not to incorporate air The icing can be used immediately or packaged and frozen for later use.

EXAMPLE 18

| Ingredient | parts |
| --- | --- |
| Flour | 70.0 |
| Yeast | 0.2 |
| Water | 20.0 |
| Malt Syrup | 0.69 |
| Sodium Bicarbonate | 0.40 |
| Malt | 0.01 |
| Example 3 Amide Ether | 7.0 |
| Salt | 1.7 |

Soda Crackers. Soda crackers may be prepared by pre-mixing ¼ of and sufficient water to make a dough. This is fermented for 24 hours. The remaining flour, enough water to make the total are added and mixed well, the ferment added and mixed again. This is proofed for 8 hours, sheeted, and baked. Afterwards, Example 3 Amide Ether is applied to the crackers, prior to packing, with The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A fat mimetic composition of the following formula, useful as a fat replacement in edible materials:

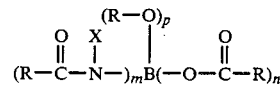

where
B is an aliphatic group having from 2 to 12 carbons,
each R is, independently, an aliphatic group having 1 to 30 carbons,
X=H, R or (CO)—R,
m=1 to 2,
n=0 to 6, and
p=1 to 2.

2. A composition according to claim 1 wherein B has 2 to 6 carbons.

3. A composition according to claim 2 wherein m=1, n=0, and p=1.

4. A composition according to claim 2 wherein m=1, n=1, and p=1.

5. An edible composition comprising, in addition to other edible ingredients, a compound of the formula

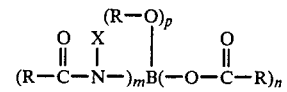

where
B is an aliphatic group having from 2 to 6 carbons,
each R is, independently, an aliphatic group having 1 to 23 carbons,
X=H, R or (CO)—R,
m=1 to 2,
n=0 to 4; and
p=1 or 2.

6. A composition according to claim 5 wherein m+n+p=2 and R has 3 to 23 carbons.

7. A composition according to claim 5 wherein m+n+p=3 and R has 3 to 23 carbons.

8. A composition according to claim 5 wherein m+n+p=4 and R has 3 to 23 carbons.

9. In a food composition having a fat ingredient, an improvement wherein at least a portion of said fat ingredient is replaced by a fat mimetic of the following formula:

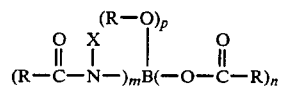

where
B is an aliphatic group having from 2 to 12 carbons,
each R is, independently, an aliphatic group having 1 to 30 carbons,
X=H, R or (CO)—R,
m=1 to 2,
n=0 to 6, and
p=1 or 2.

10. A composition according to claim 9 wherein B has 2 to 6 carbons, m=1, n=0, and p=1.

11. A composition according to claim 9 wherein B has 2 to 6 carbons and m+n+p=3 top 4.

12. A composition according to claim 9 wherein said food composition is selected from the group consisting of dairy products, bakery products, and salad dressings.

13. A composition according to claim 9 wherein said fat mimetic delivers less than 5 kcal/gram upon being metabolized.

14. A composition according to claim 13 wherein said fat mimetic delivers less than 3 kcal/gram upon being metabolized.

15. A composition according to claims 1, 5 or 9 wherein R has 3 to 23 carbons.

16. A composition according to claim 15 wherein R has 15 to 17 carbon atoms.

17. A composition according to claims 1, 5 or 9 wherein R derived from acids selected from the group consisting of acetic, propionic, butyric, caproic, caprylic, pelargonic, capric, undecanoic, lauric, myristic, palmitic, stearic, arachidic, behenic, erucic, brassidic, lignoceric, cerotic, montanic, melissic, palmitoleic, oleic, vaccenic, linoleic, linolenic, eleostearic, arachidonic, nervonic, eicosapentaenoic, docosatetraenoic, docosapentaenoic, and docosahexaenoic acid, and mixtures thereof.

18. A composition according to claims 1, 5 or 9 wherein R is derived from mixtures of acids obtained from the hydrolysis of non-hydrogenated, partially hydrogenated or fully hydrogenated oils selected from the group consisting of soybean, safflower, sunflower, high oleic sunflower, sesame, peanut, corn, olive, rice bran, canola, babassu nut, coconut, palm, palm kernel, lupin, nasturtium seed, mustard seed, cottonseed, low erucic rapeseed, dairy butterfat and marine oil, and fractions thereof.

19. An edible composition comprising, in addition to other edible ingredients, an amide ether compound having a $C_2$ to $C_6$ aliphatic backbone to which are attached one $C_1$ to $C_{30}$ aliphatic group in amide linkage and one $C_1$ to $C_{30}$ aliphatic group in ether linkage.

20. An edible composition comprising, in addition to other edible ingredients, an amide ether compound having a $C_2$ to $C_6$ aliphatic backbone to which are attached one $C_1$ to $C_{30}$ aliphatic group in amide linkage, one $C_1$ to $C_{30}$ aliphatic group in ether linkage, and one $C_1$ to $C_{30}$ aliphatic group in ester linkage.

21. A composition according to claims 19 or 20 wherein said edible composition is a low calorie food composition.

22. A composition according to claims 19 or 20 wherein said $C_1$ to $C_{30}$ aliphatic groups have 3 to 23 carbons.

23. A method of reducing the calories in a food composition having an edible fat component, which method comprises formulating said composition with a fat mimetic of the formula:

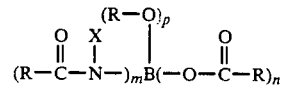

where
B is an aliphatic group having from 2 to 12 carbons,
each R is, independently, an aliphatic group having 1 to 30 carbons,
X=H, R or —(—CO)—R,
m=1 or 2,
n=0 to 6, and
p=1 or 2.

24. A method according to claim 23 wherein B has 2 to 6 carbons, m=1, n=0, p=1, and R has 3 to 23 carbons.

25. A method according to claim 23 wherein B has 2 to 6 carbons, m=1, n=1, p=1, and R has 3 to 23 carbons.

26. A method of formulating a fat-containing food composition, which method comprises formulating said food composition with a composition according to any of claims 1, 5, or 9.

27. A composition according to claim 5 wherein said compound has an array of R groups selected to include 95% derived from fatty acids having 14 to 18 carbons.

28. A composition according to claim 5 wherein said compound delivers less than 5 kcal/gram upon being metabolized.

29. A composition according to claim 21 wherein said compound delivers less than 3 kcal/gram upon being metabolized.

* * * * *